United States Patent [19]

Fry et al.

[11] Patent Number: 4,703,407
[45] Date of Patent: Oct. 27, 1987

[54] POWER SUPPLY FOR TOTEM POLE POWER SWITCHES

[75] Inventors: John J. Fry, Wickliffe; Edward Bastijanic, Concord; John W. Robertson, Jr., Chesterland, all of Ohio

[73] Assignee: The Babcock & Wilcox Company, New Orleans, La.

[21] Appl. No.: 935,351

[22] Filed: Nov. 26, 1986

[51] Int. Cl.⁴ .............................................. H02M 3/335
[52] U.S. Cl. ...................................... 363/16; 323/271; 320/1
[58] Field of Search ........................... 363/16–17; 323/268, 271; 320/1; 307/500, 255, 288, 313

[56] References Cited

U.S. PATENT DOCUMENTS 3,943,428  3/1976  Whidden ............................ 320/1 X
4,288,738  9/1981  Rogers et al. ........................ 323/271
4,322,636  3/1982  Schroder ............................. 320/1 X
4,395,675  7/1983  Toumani .............................. 323/271

Primary Examiner—Peter S. Wong
Attorney, Agent, or Firm—Vytas R. Matas; Robert J. Edwards

[57] ABSTRACT

An improved power supply for power switches arranged in a totem pole configuration is disclosed. A single power supply, having an output voltage substantially less than the voltage applied to the upper power switch, periodically charges a capacitor within a flying capacitor circuit. Microprocessor based control circuitry controls the charging and discharging of the capacitor and the periodic operation of the power switches resulting in the voltage at the output of the power switches being at system common or at the voltage applied to the upper power switch.

8 Claims, 1 Drawing Figure

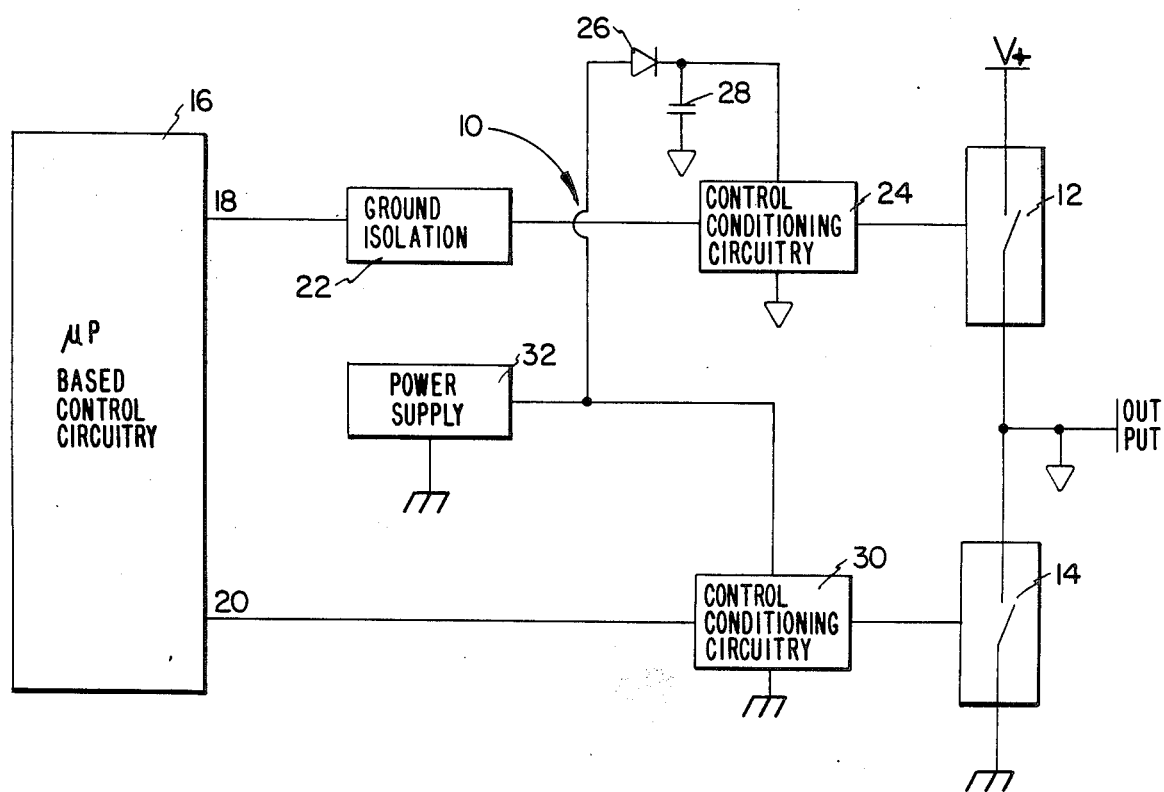

POWER SUPPLY FOR TOTEM POLE POWER SWITCHES

TECHNICAL FIELD

The present invention relates generally to power switching circuits, and more particularly to an improved power supply for power switches arranged in a totem pole circuit configuration.

BACKGROUND ART

Totem pole circuit configurations are widely used in power switching circuits. In such types of circuit configurations, the upper power switch often operates at a high voltage with respect to the circuit common. Because of this, the power supply for these circuits must be capable of operating at substantially high voltages. Thus, many totem pole power switching circuits utilize PNP transistors for the upper power switch and employ multiple isolated power supplies. Such PNP transistors generally lag their NPN counterparts with respect to both voltage and current ratings, and thus, adversely affect the efficiency of the power switching circuits. In addition, isolated power supplies tend to be bulky and significantly increase the cost of the switching circuit.

Because of the foregoing, it has become desirable to develop a power supply system for power switches arranged in a totem pole circuit configuration which eliminates the need for isolated power supplies and/or power supplies capable of operating at substantially high voltages.

SUMMARY OF THE INVENTION

The present invention solves the aforementioned problems associated with the prior art as well as other problems by providing an improved power supply system for power switches arranged in a totem pole circuit configuration. The improved power supply system involves a single power supply having an output voltage that is substantially less than the voltage applied to the upper power switch and a flying capacitor circuit which is charged to the output voltage of the power supply. Microprocessor based control circuitry provides the logic necessary to control the upper and lower power switches and regulates the charging of a capacitor in the flying capacitor circuit. A ground isolation circuit isolates the microprocessor based control circuitry from the voltage that is applied to the upper power switch. Actuation of the lower power switch and the deactuation of the upper power switch causes the capacitor to be charged by the power supply resulting in the output of the power switches to be maintained at the system common. Conversely, actuation of the upper power switch and deactuation of the lower power switch causes the capacitor to discharge through its load so as to maintain a voltage at the output of the power switches equal to the voltage applied to the upper power switch.

BRIEF DESCRIPTION OF THE DRAWING

The single figure of the drawing is a schematic diagram representing the power supply system of the present invention.

DESCRIPTION OF THE PREFERRED EMBODIMENT

Referring now to the drawing where the illustration is for the purpose of describing the preferred embodiment of the present invention and is not intended to limit the invention hereto, the Figure is a schematic diagram of a power supply system 10 for power switches 12 and 14 arranged in a totem pole configuration. As such, the power supply system 10 includes microprocessor based control circuitry 16 having an output 18 connected to the upper half of the power supply system 10 and an output 20 connected to the lower half of the power supply system 10. As shown, output 18 of the microprocessor based control circuitry 16 is connected to the input to a ground isolation circuit 22 whose output is connected to the input to control conditioning circuitry 24. A flying capacitor circuit comprised of a diode 26 and a capacitor 28 is connected to another input to the control conditioning circuitry 24. The output of the control conditioning circuitry 24 is connected to the power switch 12 and controls the operation thereof. A voltage source V+ is connected to the input to the power switch 12 whose output is connected to the output of the power switch 14 in a totem pole configuration. It should be noted that capacitor 28 and control conditioning circuitry 24 are referenced to a common which is the output of the power switches 12 and 14. This common can be a system common, V+, or an independent level depending upon the state of the power switches 12 and 14. The output 20 of the microprocessor based control circuitry 16 is connected to the input to control conditioning circuitry 30 whose output is connected to and controls the operation of the power switch 14. A power supply 32 is provided and its output is connected to the anode of diode 26 and to an input to control conditioning circuitry 30. The power supply 32 provides an output voltage which is lower than voltage V+ and powers the lower half of the power supply system 10. The power supply 32, control conditioning circuit 30 and power switch 14 are referenced to the system common.

The microprocessor based control circuitry 16 provides the logic necessary to control the operation of the power switches 12 and 14 and to charge the capacitor 28 in the flying capacitor circuit. The ground isolation circuit 22 isolates the control logic within the microprocessor based control circuitry 16 from the control conditioning circuitry 24 thus allowing the microprocessor based control circuitry 16 to operate at voltages much less than voltage V+.

Operationally, when the power supply system 10 is inactive or when it becomes activated, firmware within the microprocessor based control circuitry 16 maintains the power switch 14 in a closed condition. Firmware in this case is the software library in the ROM of the microprocessor which can be utilized by other software, such as the main logic program. Thus, the output of the power switches 12 and 14 is maintained at system common permitting capacitor 28 to charge to the output voltage of power supply 32. This output voltage is substantially less than voltage V+. When the microprocessor based control circuitry firmware 16 determines that power switch 12 should be closed, it is so closed and power switch 14 is opened. When power switch 12 is closed, the output of power switches 12 and 14 is referenced to voltage V+, and diode 26 prevents voltage V+ from appearing at the output of the power supply 32. During this phase of operation, the energy stored within capacitor 28 is used to supply power to the control conditioning circuitry 24 and to maintain the required biasing to keep power switch 12 closed. When the microprocessor based control circuitry firmware 16 determines that the output of the power switches 12 and 14 should return to system common, power switch 12 is allowed to open and power switch 14 is closed. In this manner, the capacitor 28 can then be recharged to the output voltage of power supply 32. The foregoing operating cycle can continue indefinitely. It should be noted that the maximum time that power switch 12 can remain closed is determined by the discharge time constant of capacitor 28 through its load. Conversely, the minimum time that power switch 14 can remain closed is determined by the time required to charge the capacitor 28 through diode 26. It is very advantageous that the charge time of the capacitor 28 be much shorter than its discharge time. It should also be noted that power switch 14 does not necessarily need to remain closed during periods of inactivity. Alternatively, power switch 14 can be closed briefly after periods of inactivity permitting capacitor 28 to charge before the foregoing operating cycle is commenced.

It is apparent that the foregoing power supply system 10 provides significant advantages over the prior art in numerous areas such as size, cost, number of components and efficiency. The invention eliminates the need for a separate power supply for the upper half of the system 10. The components that are required by the system are considerably smaller and less expensive than the power supply that they replace. The system is also very efficient since the only loss is the voltage drop across the diode 26. In addition, the microprocessor base control circuitry 16 already contains the bulk of the logic required to implement the power supply system 10, and only a small amount of firmware must be added to implement same.

It should be noted that this power supply system 10 is especially useful for pulse width modulated systems, which, by their nature, require the alternate firing of power switches at regular intervals. Thus, the number and type of applications in which this power supply system 10 can be utilized is almost limitless.

Certain modifications and improvements will occur to those skilled in the art upon reading the foregoing. It should be understood that all such modifications and improvements have been deleted herein for the sake of conciseness and readability but are properly within the scope of the following claims.

We claim:

1. A system for supplying power to switches arranged in a totem pole circuit configuration comprising:
   a power source electrially connected to a first switch and to a second switch arranged in a totem pole circuit configuration;
   energy storage means electrically connected to the first switch and said power source; and
   means for controlling periodic operation of the first switch and the second switch resulting in periodic charging and discharging of said energy storage means and periodic application of a predetermined voltage at the output of the first switch and the second switch.

2. The power supply system as defined in claim 1 wherein said periodic switch operation is comprised of a first phase of operation wherein said energy storage means is charged by said power source and a second phase of operation wherein said energy storage means is allowed to discharge.

3. The power supply system as defined in claim 2 wherein the output of the first switch and the second switch is referenced to a system common during said first phase of operation and wherein the voltage at the output of the first switch and the second switch is said predetermined voltage during said second phase of operation.

4. The power supply system as defined in claim 2 wherein the first switch is actuated and the second switch is deactuated during said first phase of operation and wherein the second switch is actuated and the first switch is deactuated during said second phase of operation.

5. A system for supplying power to switches arranged in a totem pole circuit configuration comprising:
   a first switch;
   a second switch electrically connected to said first switch in a totem pole configuration and having an output therebetween;
   a power supply electrically connected to said first switch and said second switch;
   energy storage means electrically connected to said first switch and a power source; and
   means for controlling periodic operation of said first switch and said second switch resulting in periodic charging and discharging of said energy storage means and periodic application of a predetermined voltage at said output of said first and second switches.

6. The power supply system as defined in claim 5 wherein said periodic switch operation is comprised of a first phase of operation wherein said energy storage means is charged by said power source and a second phase of operation wherein said energy storage means is allowed to discharge.

7. The power supply system as defined in claim 6 wherein said output of said first switch and said second switch is referenced to a system common during said first phase of operation and wherein the voltage at said output of said first switch and said second switch is said predetermined voltage during said second phase of operation.

8. The power supply system as defined in claim 6 wherein said first switch is actuated and said second switch is deactuated during said first phase of operation and wherein said second switch is actuated and said first switch is deactuated during said second phase of operation.

* * * * *